United States Patent
Kondo et al.

(10) Patent No.: US 8,038,969 B2
(45) Date of Patent: Oct. 18, 2011

(54) RARE METAL/PLATINUM-GROUP METAL EXTRACTANT AND METHOD FOR EXTRACTING RARE METALS AND PLATINUM-GROUP METALS

(75) Inventors: Yoshihiko Kondo, Akita-ken (JP); Atsushi Shibayama, Akita-ken (JP); Fumio Hamada, Akita-ken (JP); Manabu Yamada, Akita-ken (JP); Mitsuhiro Akama, Akita-ken (JP); Takanori Imai, Akita-ken (JP)

(73) Assignee: National University Corporation Akita University, Akita-shi (JP)

( * ) Notice: Subject to any disclaimer, the term of this patent is extended or adjusted under 35 U.S.C. 154(b) by 29 days.

(21) Appl. No.: 12/597,974

(22) PCT Filed: Jun. 6, 2007

(86) PCT No.: PCT/JP2007/061464
§ 371 (c)(1),
(2), (4) Date: Oct. 28, 2009

(87) PCT Pub. No.: WO2008/139638
PCT Pub. Date: Nov. 20, 2008

(65) Prior Publication Data
US 2010/0129277 A1    May 27, 2010

(30) Foreign Application Priority Data

May 7, 2007    (JP) .................................. 2007-122166

(51) Int. Cl.
*C01F 7/00*    (2006.01)
(52) U.S. Cl. ............................................ 423/22; 423/70
(58) Field of Classification Search .................. 423/21.5, 423/22, 70
See application file for complete search history.

(56) References Cited

U.S. PATENT DOCUMENTS 5,881,358 A * 3/1999 Miyano et al. .................... 423/8
6,602,970 B2 * 8/2003 Ando et al. .................... 526/298

FOREIGN PATENT DOCUMENTS

| JP | 10-175971 | * | 6/1998 |
| JP | 11-179104 | A | 7/1999 |
| JP | 11-199581 | A | 7/1999 |
| JP | 2000-107505 | A | 4/2000 |
| JP | 2000-178271 | A | 6/2000 |
| JP | 2001-149884 | A | 6/2001 |
| JP | 2002-069261 | A | 3/2002 |

OTHER PUBLICATIONS

Translation of Japan 10-175971, Jun. 1998.*
Takashi Kajiwara, et al; "Sulfonylcalix [4] arene as a Bis-Tridentate Facial Ligand: Syntheses and Structures of Dinuclear Complexes, $[M_2(L)(H_2O)_2(dmf)_4]$ (M=Co(II), Ni(II); $H_4L=p\text{-}tert\text{-}$Butylsulfonylcalix[4]arene)", Chemistry Letters 2001 (exact date not given in publication), p. 6 & 7.
M. KYRš, et al; "Synergistic solvent extraction of Eu, Sr and Cs into chlorobenzene solutions of the three conformers of tetrathiocalixarene and dicarbollide", Journal of Radioanalytical and Nuclear Chemistry, vol. 258, No. 3, pp. 497-509, Dec. 2003 (exact date not available).
Takasi Katsu, et al; "Ethylammonium-Selective Membrane Electrode Using $p\text{-}tert\text{-}$Butylcalix[6]arene Derivative", Analytical Sciences, vol. 18, No. 4, pp. 473-476, Apr. 2002 (exact date not available).
Hiroaki Matsumiya, et al; "Sulfonylcalix[4]arenetetrasulfonate as pre-column chelating reagent for selective determination of aluminum(III), iron(III), and titanium(IV) by ion-pair reverses-phase high-performance liquid chromatography with spectrophotometric detection", Talanta 62, pp. 337-342, Feb. 6, 2004.
International Search Report: PCT/JP2007/061464.

* cited by examiner

*Primary Examiner* — Steven Bos
(74) *Attorney, Agent, or Firm* — Ladas & Parry LLP

(57) ABSTRACT

The present invention provides a rare metal/platinum-group metal extractant, which has a completely new structure compared with the conventional rare metal/platinum-group metal extractant and which exhibits excellent extraction performance; it also provides a method for extracting rare metals and platinum-group metals using the extractant. The rare metal/platinum-group metal extractants of the present invention is the one to extract rare metals and platinum-group metals by contacting a solution, in which several kinds of rare metals and platinum-group metals are dissolved, with a solution in which a cyclic phenol sulfide of the following Formula (1) is dissolved to make the rare metals and platinum-group metals move into the cyclic phenol sulfide solution.

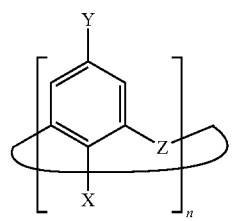

(1)

5 Claims, 1 Drawing Sheet

RARE METAL/PLATINUM-GROUP METAL EXTRACTANT AND METHOD FOR EXTRACTING RARE METALS AND PLATINUM-GROUP METALS

TECHNICAL FIELD

The present invention relates to a novel rare metal/platinum-group metal extractant for recovering useful metals such as rare metals from defective goods, waste, and wastewater from factories; the invention also relates to a method for extracting rare metals and platinum-group metals.

BACKGROUND ART

Rare metals and platinum-group metals, for example: cobalt (Co), ruthenium (Ru), rhodium (Rh), palladium (Pd), osmium (Os), iridium (Ir), platinum (Pt), titanium (Ti), vanadium (V), chromium (Cr), manganese (Mn), zinc (Zn), yttrium (Y), zirconium (Zr), niobium (Nb), silver (Ag), cadmium (Cd), lanthanum (La), cerium (Ce), neodymium (Nd), europium (Eu), terbium (Tb), gold (Au), mercury (Hg), and uranium (U), are not only used as catalyst, but also used in a wide range of applications such as hydrogen storage alloys, battery, and magnet. Japan heavily depends on imports for these metals, so, in view of stable supply of resources and environmental protection, recycle of these rare metals and platinum-group metals has become a major issue.

At present, there is a method to efficiently recover useful metal such as rare metals from defective goods, waste, and wastewater from factories, the method including the steps of: making the waste into an aqueous solution after acid treatment; and extracting the rare metals and so on from the aqueous solution. As the extractant for the solvent extraction, various extractants are on sale and used. However, the aqueous solution produced by the acid treatment has various pH and concentration conditions; in addition to this, various kinds of metals are mixed. Therefore, to extract metals selectively from the aqueous solution under these conditions, multi-step extraction using combined extractant is conventionally performed; which is extremely expensive and takes longer period of time.

Patent Document 1: Japanese Patent Application Laid-Open (JP-A) No. 11-179104
Patent Document 2: JP-A No. 11-199581
Patent Document 3: JP-A No. 2000-107505
Patent Document 4: JP-A No. 2000-178271
Patent Document 5: JP-A No. 2001-149884
Non-Patent Document 1: Chem. Lett., 6, 2001. Talanta 62, 337, 2004

DISCLOSURE OF THE INVENTION

Problems to be solved by the Invention

Accordingly, an object of the present invention is to provide a rare metal/platinum-group metal extractant having a completely new structure, which the conventional rare metal/platinum-group metal extractants do not have, and exhibiting excellent extraction performance. Another object of the invention is to provide a method for extracting rare metals and the platinum-group metal using the rare metal/platinum-group metal extractant.

Means for Solving the Problems

The inventors firstly synthesized various derivatives of cyclic phenol sulfide having at least four phenol skeletons in the basic skeleton; then, they discovered that these derivatives exhibit excellent sensing performance about metal ion and are useful for metal separate-recovery agent (See Japanese Patent Application Laid-Open (JP-A) No. 11-199581, JP-A No. 2000-178271). The inventors had assumed that the group of cyclic phenol sulfide can extract metals selectively from a solution containing various rare metals and platinum-group metals, so they had seriously studied the assumption. As a result, they discovered that the cyclic phenol sulfide can extract some particular metal species selectively from the solution containing various metal species. Finally, they completed the present invention.

The present invention also provides a method for selectively extracting rare metals and platinum-group metals using the above rare metal/platinum-group metal extractant.

Effects of the Invention

The rare metal/platinum-group metal extractant of the present invention can selectively recover useful metals such as rare metals from defective goods, waste, and wastewater from factories without carrying out multi-step extraction using a combination of various extractants.

The rare metal/platinum-group metal extractant in the invention can not only efficiently extract rare metals and platinum-group metals contained in effluent from factories but also recover useful metals such as rare metals contained in soil and seawater.

BEST MODE FOR CARRYING OUT THE INVENTION

Figure 1:
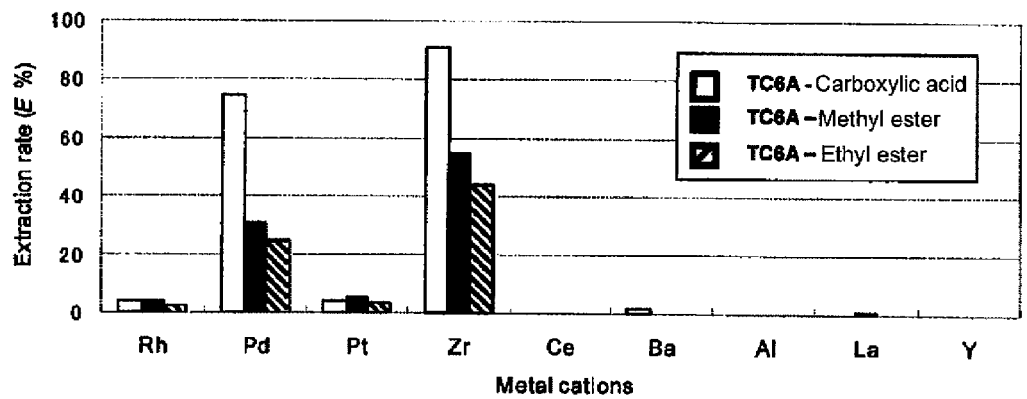
FIG. 1 is a graph showing extraction rate (E %) of Example 2.

The rare metal/platinum-group metal extractant of the present invention is the one comprising a cyclic phenol sulfide of the following Formula (1);

(Formula 1)

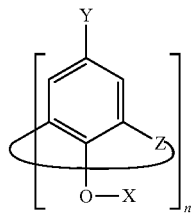

(1)

wherein X is a $CH_2COOR^1$, $R^1$ is a hydrogen atom, a methyl group, or an ethyl group; Y is a hydrocarbon group; Z is a sulfide group, a sulfinyl group, or a sulfonyl group; n is an integer of 6.

When a solution, in which several kinds of rare metals and platinum-group metals are dissolved, is contacted with the other solution in which a cyclic phenol sulfide of the following Formula (1) is dissolved, the rare metals and platinum-group metals move into the cyclic phenol sulfide solution, whereby the rare metals and platinum-group metals can be extracted.

A solvent to be used for cyclic phenol sulfide solution and another solvent to be used for solution of rare metals and platinum-group metals are mutually slightly-soluble. Examples of preferable combination of these solvents may be: a combination of a non-aqueous solvent as the solvent for cyclic phenol sulfide solution and water as the solvent for solution of rare metals and platinum-group metals.

According to the combination, it is capable of extracting rare metals and platinum-group metals in the aqueous solution by contacting a solution, in which the cyclic phenol sulfide is dissolved with the non-aqueous solvent, with an aqueous solution in which rare metals and platinum-group metals are dissolved.

Concentration of the cyclic phenol sulfide of general formula (1) in the solvent is not particularly restricted except that the upper limit is set depending on degree of solubility of the cyclic phenol sulfide.

Concentration of rare metals and platinum-group metals dissolved with the solvent to be extracted is not specifically limited; desirably, it is usually 1000 ppm.

A value of pH of the aqueous solution containing rare metals and platinum-group metals is not particularly limited; it is preferably 1 to 11.

Extraction temperature is not particularly limited as long as it is not more than boiling point of the solvent. The extraction is usually carried out at around room temperature.

Extraction operation is carried out by contacting on shaking and/or agitating a solution in which the cyclic phenol sulfide is dissolved and a solution in which the rare metals and platinum-group metals are dissolved. Conditions of shaking and agitation are not specifically restricted; shaking is usually performed at 60-200 times/min.

EXAMPLE 1

Hereinafter, the invention will be more specifically described by way of the following examples. However, the invention is not limited by these examples.

Production Example 1

A 1000 mL three neck flask was charged with: 300 g (2.0 mol) of p-tert-butylphenol, 64.0 mL of diphenyl ether, and 56.0 mL (1.0 mol) of ethylene glycol; the solution was heated with stirring under a nitrogen atmosphere. When the temperature of the solution reached 60 degree C, 28.0 g (0.5 mol) of calcium oxide was added thereto; later, the temperature of the obtained solution was raised up to 120 degree C in about 20 minutes and then reaction was carried out for 2 hours.

After reaction, ethylene glycol and produced water were removed under reduced pressure; at the same time, diphenyl ether, which was removed together with ethylene glycol and produced water, was added. The obtained solution was heated with stirring under a nitrogen atmosphere. When the temperature of the solution reached 100 degree C, full dose of 95.9 g (3.0 mol) of sulfur was added thereto; subsequently, the temperature of the mixture was raised up to 230 degree C to carry out reaction for 3 hours.

After the reaction, the resultant was naturally-cooled. When the temperature went down to 110 degree C, 250 mL of toluene was gradually added to lower the viscosity of reaction solution, and the reaction solution was quenched by pouring it into 500 mL of 4N sulfuric acid.

Segregated calcium sulfate was filtered and the filtrate was washed with saturated sodium sulfate aqueous solution. After concentrating the reaction solution, the concentrate was kept at 80 degree C.

Separately prepared 1 L of acetic acid was kept at 80 degree C. To the acetic acid, the above concentrate was added and stirred at 80 degree C for about 1 hour; thereafter, the mixed solution was left standing at room temperature overnight.

After washing the segregated precipitate with distilled water, so as to remove unwashed acetic acid, the washed precipitate was dissolved with a large quantity of chloroform and then it was washed with sodium sulfate aqueous solution.

Thereafter, the organic layer of the obtained solution was dried over sodium sulfate; the dried resultant was concentrated and kept drying under reduced pressure overnight to obtain the intermediate oligomer of cyclic phenol sulfide of the Formula 2.

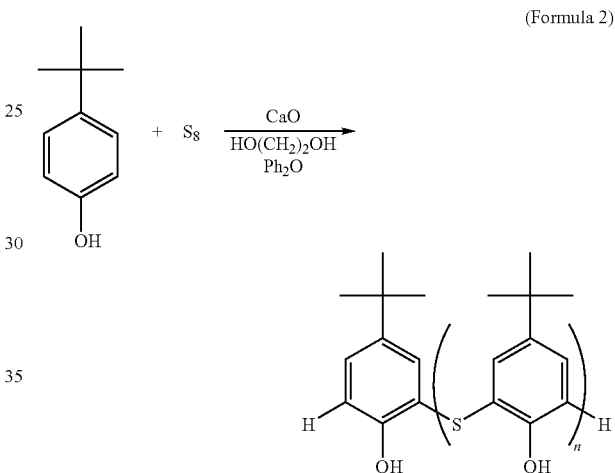

(Formula 2)

Production Example 2

A 500 mL three neck flask was charged, in the order mentioned, with: 30 g of the intermediate oligomer of cyclic phenol sulfide obtained by the above Production example 1, 64.0 mL of diphenyl ether, 3.99 g of sodium hydroxide, and 1.62 g of acetic acid; the solution was stirred under a nitrogen atmosphere. When the temperature of the solution went up to 100 degree C, full dose of 2.14 g of sulfur was added thereto. The temperature of the mixture was raised up to 230 degree C in about 1 hour to carry out reaction for 4 hours.

After reaction, the resultant was naturally-cooled and 2N sulfuric acid (100 mL) was poured thereto to quench the reaction. To the obtained solution, n-heptane (100 mL) was added and stirred for about 10 minutes.

Thereafter, the sulfuric acid was washed with anhydrous sodium sulfate aqueous solution to separate it into a water layer and an organic layer. The diphenyl ether contained in the organic layer was removed under reduced pressure; subsequently, the precipitate was extracted by adding acetone.

After filtering the extracted precipitate, followed by drying under reduced pressure, a crude crystal of cyclic phenol sulfide of the formula 3 was obtained. The crude crystal was purified by recrystallization by dissolving with chloroform.

(Formula 3)

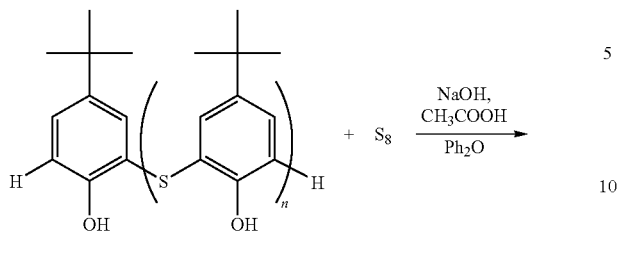

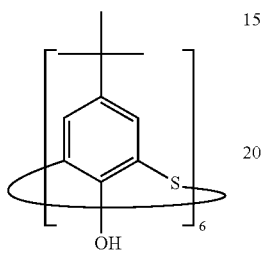

Production Example 3

A 500 mL two neck flask was charged with: 1077.13 mg (1 mmol) of the compound obtained by the Production example 2 and 2935.71 mg (9 mmol) of cesium carbonate; under a nitrogen atmosphere, 100 mL of acetone was added thereto with stirring.

To the solution, 1335 μL (12 mmol) of ethyl bromoacetate was added and heated with stirring. The mixed solution was refluxed for 3 hours to proceed the reaction.

After reaction, the reacted solution was concentrated to remove acetone.

Then, to remove unreacted ethyl bromoacetate, the reacted solution was dried at 60 degree C under reduced pressure for several hours.

Later, the resultant was dissolved with about 100 ml of chloroform; to remove by-product salts, it was washed three times with sodium sulfate aqueous solution.

The obtained organic layer was dried over sodium sulfate and concentrated; subsequently, the resultant was sufficiently dried under reduced pressure to obtain a crude product. The obtained crude product was purified by recrystallization using ethanol to obtain an objective product of the Formula 4.

(Formula 4)

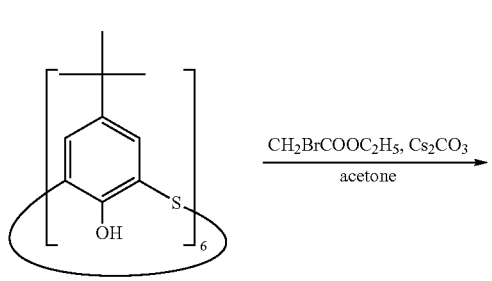

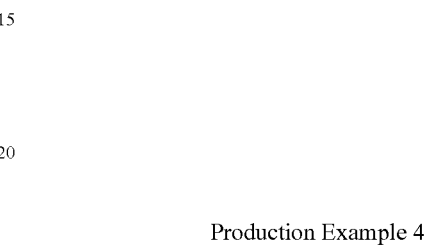

Production Example 4

A 500 mL two neck flask was charged with: 1081.93 mg (1 mmol) of the compound obtained by the Production example 2 and 1246.38 mg (9 mmol) of potassium carbonate; under a nitrogen atmosphere, 100 mL of acetone was added thereto with stirring.

To the solution, 1245 μL (12 mmol) of methyl bromoacetate was added and heated with stirring. The mixed solution was refluxed for 24 hours to proceed the reaction.

After reaction, the reacted solution was concentrated to remove acetone. Then, to remove unreacted methyl bromoacetate, the reacted solution was dried at 60 degree C under reduced pressure for several hours.

Later, the resultant was dissolved with about 100 mL of chloroform; to remove by-product salts, it was washed three times with sodium sulfate aqueous solution. The obtained organic layer was dried over sodium sulfate and concentrated; subsequently, the resultant was sufficiently dried under reduced pressure to obtain a crude product.

The obtained crude product was purified by recrystallization using ethanol to obtain an objective product of the Formula 5.

(Formula 5)

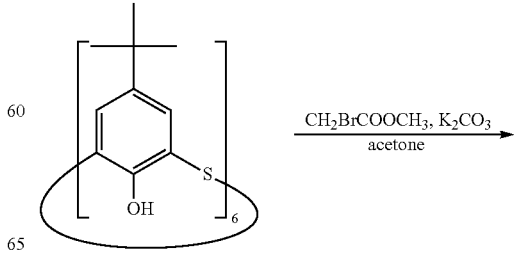

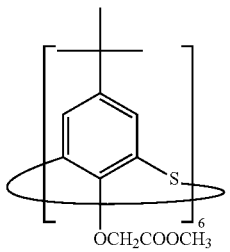

Production Example 5

A two neck flask was charged with: 1.00 g (0.63 mmol) of the compound obtained by the Production example 3, 1.10 g (27.5 mmol) of sodium hydroxide, and 250 mL of a mixed solvent of ethanol and water (ratio=3:2); the solution was heated with refluxing for 24 hours.

After reaction, the solution was naturally-cooled; then, it was quenched in an ice bath by pouring thereto 100 mL of 4N $H_2SO_4$ such that the reaction solution became pH=1.

Later, the extracted precipitation was suction filtered. Then, to remove sodium sulfate extracted at the same time, the precipitate was dissolved with acetone and filtered again to be purified.

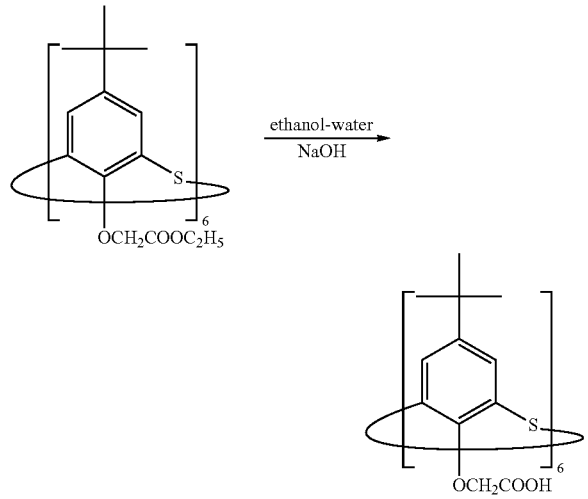

(Formula 6)

EXAMPLE 2

Extraction test of rare metal and platinum-group metal was carried out using cyclic phenol sulfide derivatives obtained by the Production examples 3, 4 and 5.

In the extraction test, the respective cyclic phenol sulfides were dissolved with chloroform; 50 mL of 2.92 mM organic layer and a PGM (Platinum-Group Metals) solution (Rh 264.3 ppm, Pd 737.8 ppm, Pt 434.1 ppm, Zr 198.2 ppm, Ce>3840.5 ppm, Ba 2118.2 ppm, Al 2272.5 ppm, La 666.9 ppm, Y 36.3 ppm), which was obtained by leaching, into a mixed solution of hydrochloric acid and hydrogen peroxide solution, a rare metal and a platinum-group metal recovered when producing automotive catalyst, were prepared; and a 50 mL of PGM solution (pH: 0.8) diluted 50-fold with distilled water was prepared.

A 200 mL separating funnel was charged with the prepared organic layer and the metal aqueous solution; the mixed solution was shaken with stirring for 30 minutes.

Thereafter, metal concentration in the water layer was analyzed using an ICP emission analyzer. The extraction rate (E %) was calculated using the following Expression 1 based on the obtained results.

$$(E\%)=(C_0-C)/C_0 \times 100 \quad \text{(Expression 1)}$$

The ratio of cyclic phenol sulfide derivatives and metal in the aqueous solution was 1:1 by mole concentration.

It should be noted that "$C_0$" means concentration (ppm) of metal in the water layer before extraction and "C" means concentration (ppm) of metal in the water layer after extraction. The results of extraction are shown in FIG. 1.

According to the results, when diluted 50-fold with distilled water, compared with ester adduct of Production examples 3 and 4, the carboxylic acid adduct obtained by Production example 5 exhibited high-performance in selective extraction of Pd (74%) and Zr (90%). Little metals apart from Pd and Zr were extracted with carboxylic acid adduct.

The ethyl ester adduct of Production example 3 exhibited high-performance in selective extraction of particularly Pd (24%) and Zr (44%). The methyl ester adduct of Production example 4 exhibited high-performance in selective extraction of particularly Pd (31%) and Zr (55%).

EXAMPLE 3

Extraction test of rare metal and platinum-group metal was carried out using cyclic phenol sulfide derivatives obtained by the Production example 5.

In the extraction test, the cyclic phenol sulfide was dissolved with chloroform; 50 mL of 2.92 mM organic layer and a PGM (Platinum-Group Metals) solution (Rh 264.3 ppm, Pd 737.8 ppm, Pt 434.1 ppm, Zr 198.2 ppm, Ce>3840.5 ppm, Ba 2118.2 ppm, Al 2272.5 ppm, La 666.9 ppm, Y 36.3 ppm), which was obtained by leaching, into a mixed solution of hydrochloric acid and hydrogen peroxide solution, a rare metal and a platinum-group metal recovered when producing automotive catalyst, were prepared; and a 50 mL of PGM solution diluted 50-fold with hydrochloric acid was prepared.

A 200 mL separating funnel was charged with the prepared organic layer and the metal aqueous solution; the mixed solution was shaken with stirring for 30 minutes.

Thereafter, metal concentration in the water layer was analyzed using an ICP emission analyzer. The extraction rate (E %) was calculated using the following Expression 2 based on the obtained results.

$$(E\%)=(C_0-C)/C_0 \times 100 \quad \text{(Expression 2)}$$

The ratio of cyclic phenol sulfide derivative and metal in the aqueous solution was 1:1 by mole concentration.

Figure 2:
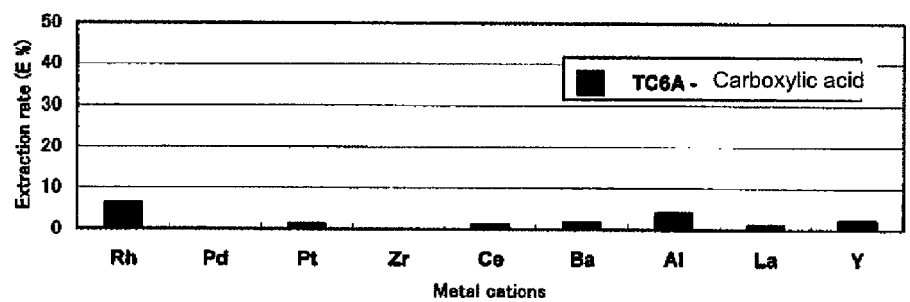
FIG. 2 is a graph showing extraction rate (E %) of Example 3.

It should be noted that "$C_0$" means concentration (ppm) of metal in the water layer before extraction and "C" means concentration (ppm) of metal in the water layer after extraction. The results of extraction are shown in FIG. 2.

According to the results, when diluted 50-fold (pH: −1.0) with hydrochloric acid, practically, all kinds of metals were not extracted with the carboxylic acid adduct obtained by Production example 5.

EXAMPLE 4

Tests for extracting rare metals and platinum-group metals were carried out using the cyclic phenol sulfide derivative of Production example 5.

In the extraction test, the cyclic phenol sulfide was dissolved with chloroform; 50 mL of 2.92 mM organic layer and 50 mL of a solution, which was obtained by diluting 10-fold with hydrochloric acid a standard solution (100 ppm) containing various metals (Rh, Pd, Pt, Zr, Ce, Ba, Al, La, Y) as rare metals and platinum-group metals, were prepared.

A 200 mL separating funnel was charged with the prepared organic layer and the metal aqueous solution; the mixed solution was shaken with stirring for 30 minutes.

Later, metal concentration in the water layer was analyzed using an ICP emission analyzer. The extraction rate (E %) was calculated using the following Expression 3 based on the obtained results.

$$E\% = (C_0 - C)/C_0 \times 100 \quad \text{(Expression 3)}$$

The ratio of cyclic phenol sulfide derivative and metal in the aqueous solution was 1:1 by mole concentration.

Figure 3:
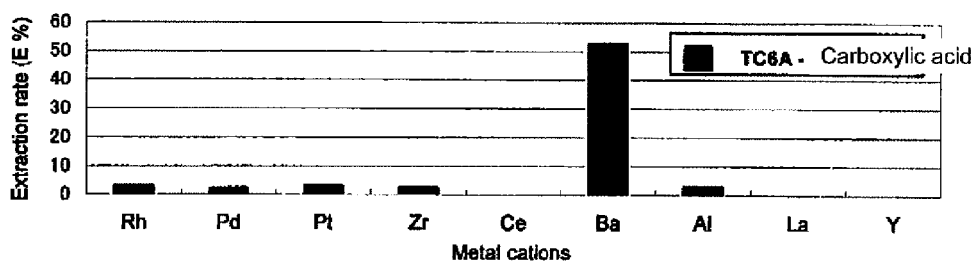
FIG. 3 is a graph showing extraction rate (E %) of Example 4.

It should be noted that "$C_0$" means concentration (ppm) of metal in the water layer before extraction and "C" means concentration (ppm) of metal in the water layer after extraction. The results of extraction are shown in FIG. 3.

According to the results, when diluted 10-fold with hydrochloric acid, the carboxylic acid adduct of Production example 5 could extract 50% of Ba. Meanwhile, the carboxylic acid adduct showed little performance in extracting other metals.

INDUSTRIAL APPLICABILITY

The metal extractant of the present invention can efficiently extract rare metals and platinum-group metals contained in the effluent from factories and it can be used for recovering useful metals such as rare metals from soil and seawater.

The invention claimed is:

1. A method for extracting Pd and/or Zr from an aqueous solution containing Pd and/or Zr, the method comprising the step of:
   contacting the aqueous solution with an organic solution containing a cyclic phenol sulfide represented by the following formula (1):

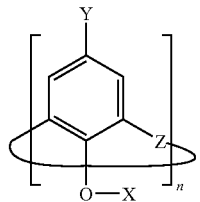

(1)

wherein X is $CH_2COOR^1$, $R^1$ is a hydrogen atom, a methyl group, or an ethyl group; Y is a hydrocarbon group; Z is a sulfide group, a sulfinyl group, or a sulfonyl group: and n is 6.

2. A method for extracting Pd and/or Zr from an aqueous solution containing Pd and/or Zr, the method comprising the steps of:
   adjusting a value of pH of the aqueous solution to 0.8; and
   contacting the aqueous solution with an organic solution containing a cyclic phenol sulfide represented by the following formula (1):

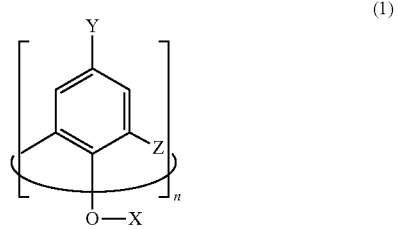

(1)

wherein X is $CH_2COOR^1$, $R^1$ is a hydrogen atom, a methyl group, or an ethyl group; Y is a hydrocarbon group; Z is a sulfide group, a sulfinyl group, or a sulfonyl group; and n is 6.

3. The method according to claim 2, wherein the aqueous solution containing Pd and/or Zr is an aqueous solution containing Pd, Zr, or a mixture thereof together with Pt.

4. The method according to claim 1, wherein the aqueous solution containing Pd and/or Zr is an aqueous solution containing Rh, Pd, Pt, Zr, Ce, Ba, Al, La, and Y.

5. The method according to claim 2, wherein the aqueous solution containing Pd and/or Zr is an aqueous solution containing Rh, Pd, Pt, Zr, Ce, Ba, Al, La, and Y.

* * * * *